(12) United States Patent
Ahrnberg et al.

(10) Patent No.: US 11,622,191 B2
(45) Date of Patent: Apr. 4, 2023

(54) ENTERTAINMENT SYSTEM FOR A VEHICLE INCLUDING A SOUND EMITTING MODULE

(71) Applicant: Volvo Car Corporation, Gothenburg (SE)

(72) Inventors: Pierre Ahrnberg, Surte (SE); Jonas Göthlin, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 137 days.

(21) Appl. No.: 17/079,697

(22) Filed: Oct. 26, 2020

(65) Prior Publication Data
US 2021/0144470 A1 May 13, 2021

(30) Foreign Application Priority Data
Nov. 8, 2019 (EP) .................................... 19208035

(51) Int. Cl.
*H04R 1/40* (2006.01)
*B60R 11/02* (2006.01)
(Continued)

(52) U.S. Cl.
CPC .......... *H04R 1/403* (2013.01); *B60R 11/0217* (2013.01); *B60R 11/0229* (2013.01);
(Continued)

(58) Field of Classification Search
None
See application file for complete search history.

(56) References Cited

U.S. PATENT DOCUMENTS 5,699,057 A * 12/1997 Ikeda ...................... G01S 11/12
382/104
5,754,664 A * 5/1998 Clark ....................... H04R 5/02
381/86
(Continued)

FOREIGN PATENT DOCUMENTS

CN        205647919 U   * 10/2016
CN        205647919 U     10/2016
(Continued)

OTHER PUBLICATIONS

Mar. 12, 2020 European Search Report issued on International Application No. 19208035.

*Primary Examiner* — Oyesola C Ojo
(74) *Attorney, Agent, or Firm* — Clements Bernard Walker; Christopher L. Bernard

(57) ABSTRACT

An entertainment system for a vehicle, the system including: a sound emitting module including multiple sound emitting units, wherein the sound emitting module is adapted to be arranged such that the multiple sound emitting units are distributed along the transverse extension of a windshield of the vehicle and to emit sound towards the windshield, and a display device arranged between the sound emitting module and an occupant seating position, wherein the display device is arranged to cover the sound emitting module as seen from the occupant seating position. The disclosed entertainment system provides the advantage of integrating a more advanced sound system in the form of a sound emitting module including multiple sound emitting units.

19 Claims, 4 Drawing Sheets

(51) Int. Cl.
*G09G 5/02* (2006.01)
*H04R 1/02* (2006.01)
*H04R 3/12* (2006.01)
*B60J 1/00* (2006.01)
*B60S 1/02* (2006.01)
*H04R 1/26* (2006.01)
*H04R 1/34* (2006.01)
*B60R 11/00* (2006.01)

(52) U.S. Cl.
CPC ............... *G09G 5/02* (2013.01); *H04R 1/023* (2013.01); *H04R 1/025* (2013.01); *H04R 1/26* (2013.01); *H04R 1/345* (2013.01); *H04R 3/12* (2013.01); *B60J 1/002* (2013.01); *B60R 2011/0005* (2013.01); *B60R 2011/0008* (2013.01); *B60S 1/023* (2013.01); *G09G 2380/10* (2013.01); *H04R 2499/13* (2013.01)

(56) References Cited

U.S. PATENT DOCUMENTS

| | | | | |
|---|---|---|---|---|
| 5,870,484 | A * | 2/1999 | Greenberger | H04S 3/002 381/300 |
| 6,304,173 | B2 * | 10/2001 | Pala | B60R 11/0235 348/148 |
| 6,614,913 | B1 * | 9/2003 | Allen | H04R 1/025 381/86 |
| 6,980,092 | B2 * | 12/2005 | Turnbull | H04M 1/6091 340/426.36 |
| 7,457,425 | B2 * | 11/2008 | Fincham | H04R 5/02 381/302 |
| 7,561,706 | B2 * | 7/2009 | Holmi | H04S 3/002 381/86 |
| 8,170,265 | B2 * | 5/2012 | Hagedorn-Maillard | H04R 1/086 381/389 |
| 8,457,324 | B2 * | 6/2013 | Tice | H04R 1/323 381/71.7 |
| 9,338,554 | B2 * | 5/2016 | Christoph | H04S 7/301 |
| 9,832,586 | B2 * | 11/2017 | Paik | H04S 7/303 |
| 10,448,180 | B1 * | 10/2019 | Helm | B60R 11/0217 |
| 2003/0219137 | A1 * | 11/2003 | Fincham | H04R 5/02 381/86 |
| 2003/0227375 | A1 * | 12/2003 | Yong | B60Q 1/503 340/425.5 |
| 2004/0237111 | A1 * | 11/2004 | Iraclianos | H04R 31/00 725/77 |
| 2005/0249356 | A1 * | 11/2005 | Holmi | H04S 7/30 381/86 |
| 2007/0116298 | A1 * | 5/2007 | Holmi | H04R 5/02 381/86 |
| 2011/0083075 | A1 * | 4/2011 | MacNeille | B60K 37/06 381/26 |
| 2015/0123422 | A1 * | 5/2015 | Bennett | B60R 9/04 296/136.1 |
| 2016/0042664 | A1 * | 2/2016 | Haberl | G09B 19/167 434/62 |
| 2017/0064445 | A1 * | 3/2017 | Pierfelice | H04R 3/04 |
| 2019/0084370 | A1 * | 3/2019 | Coppola | B60R 1/00321 |
| 2019/0094959 | A1 * | 3/2019 | Tan | B60K 35/00 |
| 2019/0304431 | A1 * | 10/2019 | Cardinaux | G10K 11/17813 |
| 2020/0317129 | A1 * | 10/2020 | Englander | B60R 1/04 |
| 2021/0144470 | A1 * | 5/2021 | Ahrnberg | B60R 11/0229 |

FOREIGN PATENT DOCUMENTS

| | | | |
|---|---|---|---|
| DE | 19807259 A1 * | 8/1999 | ........... B60H 1/3407 |
| DE | 19807259 B4 | 9/2007 | |
| DE | 102010009490 A1 * | 9/2011 | ............. B60K 35/00 |
| EP | 1228916 A2 * | 8/2002 | ........... B60H 1/0055 |
| EP | 1228916 A2 | 8/2002 | |
| JP | 2016022843 A * | 2/2016 | ............. B60R 11/02 |
| JP | 2016022843 A | 2/2016 | |
| JP | 2017144800 A * | 8/2017 | ............... B60H 1/34 |
| JP | 2017144800 A | 8/2017 | |
| WO | 03001885 A2 | 1/2003 | |
| WO | WO-03001885 A2 * | 1/2003 | ............. B60K 35/00 |

* cited by examiner

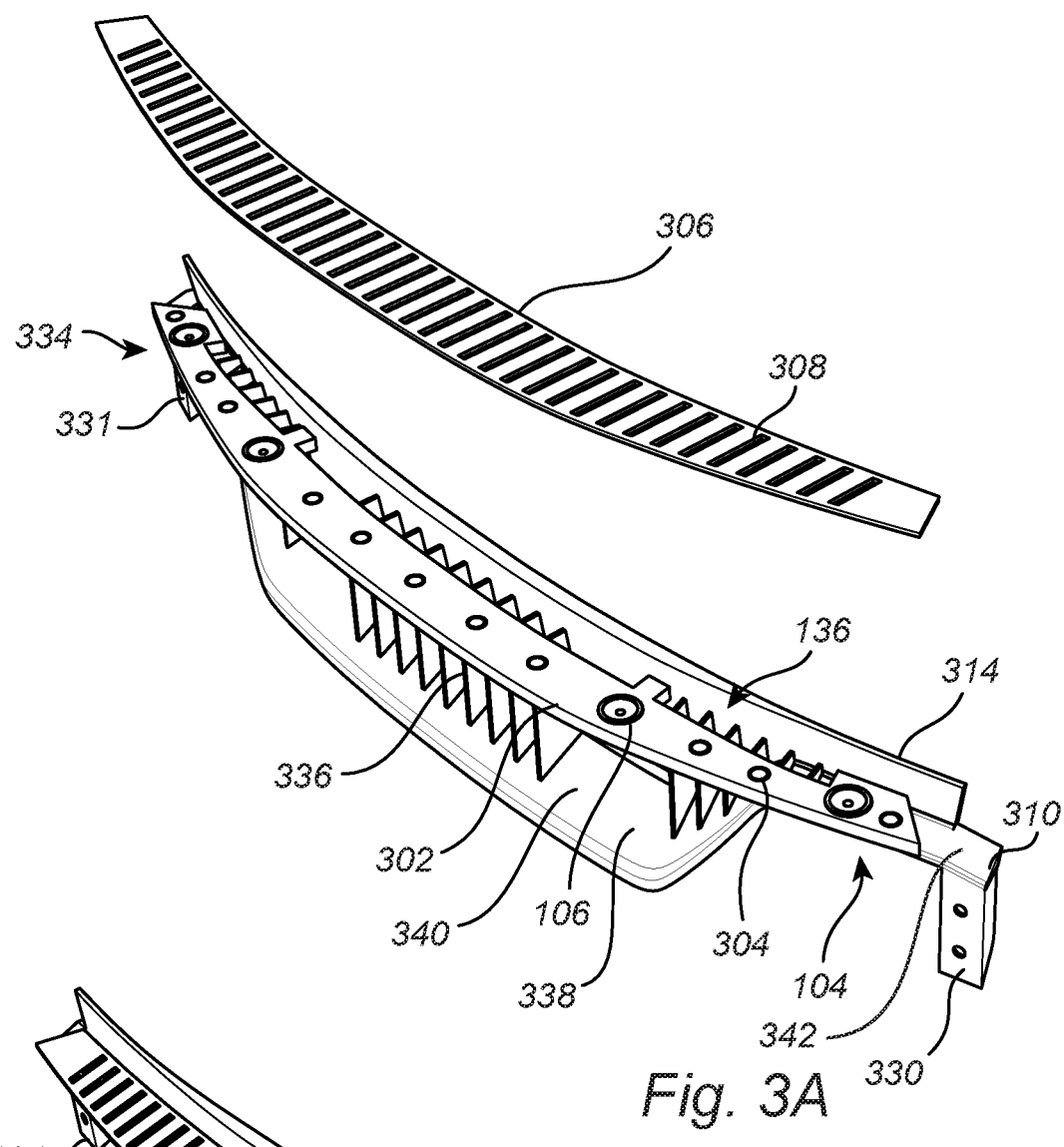
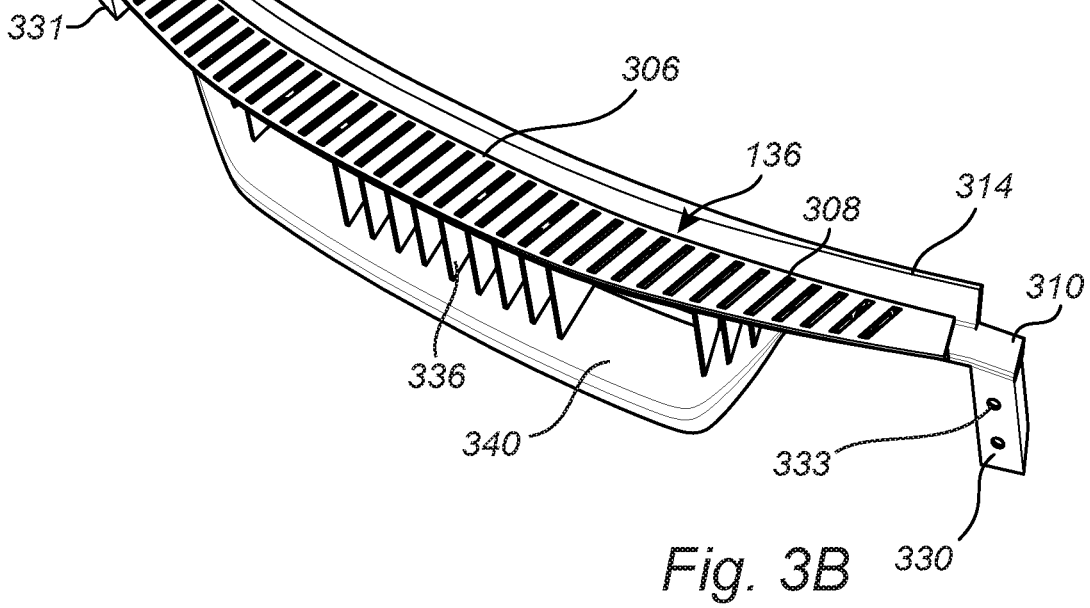

ENTERTAINMENT SYSTEM FOR A VEHICLE INCLUDING A SOUND EMITTING MODULE

CROSS-REFERENCE TO RELATED APPLICATION

The present disclosure claims the benefit of priority of co-pending European Patent Application No. 19208035.6, filed on Nov. 8, 2019, and entitled "AN ENTERTAINMENT SYSTEM FOR A VEHICLE INCLUDING A SOUND EMITTING MODULE," the contents of which are incorporated in full by reference herein.

TECHNICAL FIELD

The present disclosure generally relates to an entertainment system for a vehicle. The present disclosure further relates to a sound emitting module for a vehicle entertainment system, to a display device for a vehicle entertainment system, and to a vehicle including an entertainment system.

BACKGROUND

Vehicle entertainment systems are becoming more advanced and at least in premium vehicles provide for high quality display and audio systems, and often with the ability to connect to cloud services for accessing e.g. music. The vehicle manufacturers spend much effort in integrating the entertainment systems in the vehicle in visually appealing ways. At the same time, the integration of the entertainment systems should provide a user-friendly control of the entertainment systems to enhance the user experience.

The overall impression of the vehicle cabin with the more advanced entertainment systems appears to be approaching a "living room experience". However, there is still room for improving the entertainment systems in this regard. For example, components such as more advanced displays and audio systems may be areas of improvement. Further, ways of integrating for example displays and audio systems is another area where improvements are conceivable.

SUMMARY

The disclosed subject matter generally relates to an entertainment system for a vehicle which provides for improved integration of at least a sound emitting module in the vehicle.

In prior art entertainment systems in vehicles, the speakers are distributed over a large portion of the vehicle interior in an attempt to provide satisfactory sound quality. There may be speakers arranged in e.g. doors, on the instrument panel, and in the ceiling.

However, a large portion of sound emitting units can instead be placed such that the multiple sound emitting units are distributed along the transverse extension of a windshield of the vehicle and to emit sound towards the windshield while still providing at least acceptable or even improved sound quality sound quality for the occupants of the vehicle. This provides for a more integrated system in which the sound emitting units can be hidden for the occupants of the vehicle.

The disclosed entertainment system further provides the advantage of integrating a more advanced sound system in the form of a sound emitting module including multiple sound emitting units. The multiple sound emitting units are arrangeable between a display device and a windshield. In this way, the multiple sound emitting units are arranged behind the display device as seen from an occupant seating position. Thus, the multiple sound emitting units are not visible for the occupants seated in the vehicle. Further, the multiple sound emitting units are integrated in the vehicle interior without obstructing design features or other functional features, thereby making more space available for such other features. In addition, despite the suggested location of the sound emitting module, the sound quality in the vehicle cabin may be improved.

In a first aspect, the present disclosure provides an entertainment system for a vehicle, the system including: a sound emitting module including multiple sound emitting units, wherein the sound emitting module is adapted to be arranged such that the multiple sound emitting units are distributed along the transverse extension of a windshield of the vehicle and to emit sound towards the windshield, and a display device arranged to cover the sound emitting module as seen from the occupant seating position.

The disclosed entertainment system provides for improved integration of a sound emitting module which can provide improved sound quality in the vehicle cabin. In particular, the sound emitting module may be provided as a soundbar often used in advanced home audio system.

In one embodiment, the sound emitting module is adapted to be arranged in an air vent outlet arranged adjacent to the windshield of the vehicle and adapted to direct an air flow towards the windshield, the air vent outlet having a main extension along the width of the windshield. This provides for even further improved integration of the sound emitting module in the vehicle interior. For example, an an air vent mesh may be arrangeable to cover the air vent outlet and the multiple sound emitting units. Thus, the multiple sound emitting units are hidden also under the same mesh as the air vent outlet, thereby reducing the number of parts and also the overall cost.

Further features of, and advantages with, the embodiments of the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF DRAWINGS

These and other aspects of the entertainment system will now be described in more detail, with reference to the appended drawings showing example embodiments of the present disclosure, wherein:

FIG. 3A is a conceptual illustration of a sound emitting module mounted in an air vent outlet included in a cross-car beam according to embodiments of the present disclosure;

FIG. 3B is a conceptual illustration of a sound emitting module mounted in an air vent outlet included in a cross-car beam according to embodiments of the present disclosure.

DETAILED DESCRIPTION

Figure 1A:
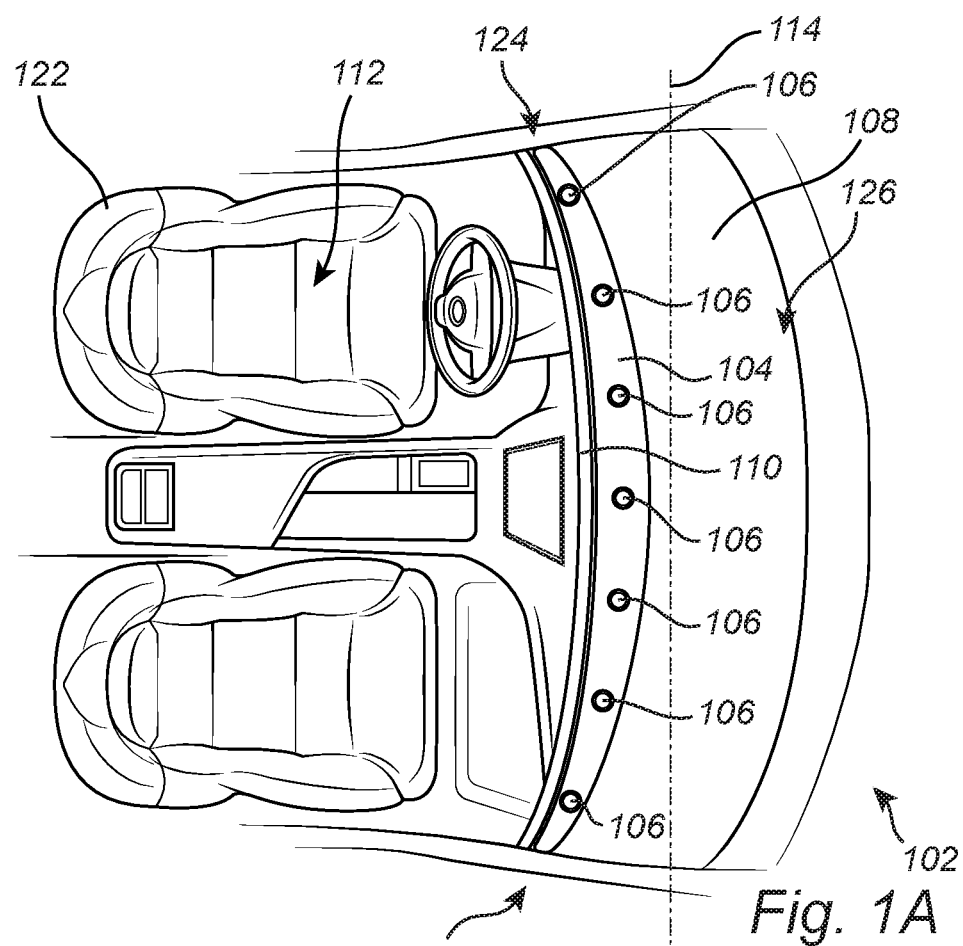
FIG. 1A conceptually illustrates an entertainment system for a vehicle according to embodiments of the present disclosure.

In the present detailed description, various embodiments of an entertainment system according to the present disclosure are described. However, the entertainment system may be embodied in many different forms and should not be construed as limited to the embodiments set forth herein; rather, these embodiments are provided for thoroughness and completeness, and to fully convey the scope of the present disclosure to the skilled person. Like reference characters refer to like elements throughout.

Figure 1B:
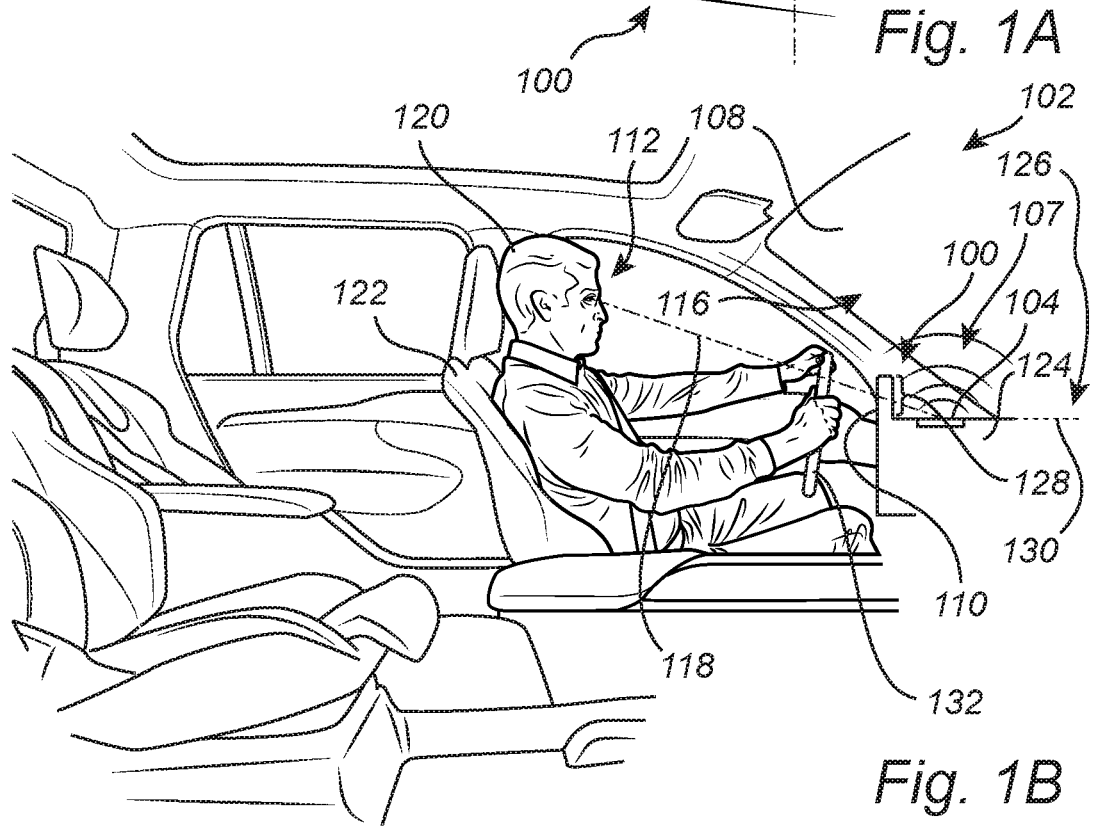
FIG. 1B is a side view of the entertainment system shown in FIG. 1A.

FIG. 1A schematically illustrates an entertainment system 100 for a vehicle 102. FIG. 1B is a side view of the entertainment system 100 in the vehicle 102. The entertainment system 100 includes a sound emitting module 104 including multiple sound emitting units 106. The sound emitting module 104 is adapted to be arranged such that the multiple sound emitting units 106 are distributed along the transverse extension of a windshield 108 of the vehicle 102 and to emit sound waves 107, better seen in FIG. 1B, towards the windshield 108. The entertainment system 100 includes a display device 110 that is arranged to cover the sound emitting module 104 as seen from the occupant seating position 112.

In this example embodiment, the display device 110 is arranged between the sound emitting module 104 and an occupant seating position 112.

A sound emitting unit includes components for transforming an electrical signal to a soundwave that propagates from the sound emitting unit, i.e. the sound emitting unit may be an electroacoustic transformer. Such components may include a membrane that may be caused to vibrate to thereby create soundwaves. A sound emitting unit may generally be a "loudspeaker".

A transverse extension of the vehicle may be along an axis 114 that lie in a side-to-side orientation of the vehicle. In other words, the transverse extension indicated by the axis 114 may be substantially perpendicular to a vehicle heading direction. The width of the windshield is defined as the extension of the windshield along the transverse axis 114.

That the sound emitting units are arranged to emit soundwaves 107 towards the windshield means that the soundwaves leaving the sound emitting units propagates in a direction that intercepts with the windshield 108. Thus, when the soundwaves 107 has propagated for a time duration, they will eventually bounce off the inner side 116 of the windshield 108, facing the vehicle interior, and propagate rearwards in the vehicle interior. Thus, the multiple sound emitting units may be arranged to emit sound waves directly towards the windshield such that the soundwaves are redirected by the windshield rearwards in the vehicle interior, i.e. in the vehicle cabin.

That the display device is arranged between the sound emitting module 104 and an occupant seating position 112 means that the display device is arranged in an intermediate position between the position of the sound emitting module and the occupant seating position 112. This means that, as seen from the occupant seating position 112, the sound emitting module 104 may be considered hidden behind the display device 110.

An occupant seating position may be defined by a vehicle seat. Further, as seen from the occupant seating position, may be what is visible to a person 120 situated in the vehicle seat 122. That the display device is arranged to cover the sound emitting module as seen from the occupant seating position may thus be considered that the display device is arranged in the line of sight 118 from the occupant seating position 112, to a person situated in a seated upright posture in the vehicle seat 122.

The sound emitting module 104 may be integrated in a structure 124 adjacent to a lower portion 126 of the windshield 108. The lower portion 126 of the windshield is the vertically lower portion of the windshield when the windshield 108 is mounted in the vehicle, i.e. closest to the hood of the vehicle. The display device 110 reaches to a height that exceeds that of the highest point of the sound emitting module 104 that may be arranged adjacent to the lower windshield portion 126. For example, a portion 128 of the display device 110 is adapted to reach above the plane 130 of the structure 124 where the sound emitting module 104 may be integrated. In this way may the display device 110 cover the sound emitting module 104 as seen from the occupant seating position 112. The structure 124 may generally be a dashboard of the vehicle. The sound emitting module 104 may be arranged flush with the plane 130 of the structure 124 or below the plane 130. Further, the sound emitting module 104 may be arranged to reach above the plane 130 of the structure 124 with the constraint that the display device 110 covers the sound emitting module 104 as seen from the occupant seating position 112.

The occupant seating position is here shown in the driver's seat 122 facing the steering wheel 132. However, the occupant seating position may equally well be in the passenger front seat next to the driver's seat.

In embodiments, the multiple sound emitting units 104 are distributed along substantially the entire width of the windshield 108. In FIG. 1A the multiple sound emitting units 104 are distributed along a large portion of the width of the windshield 108 along the transverse axis 114. For example, the multiple sound emitting units 104 may be distributed along 50%, 60%, 70%, 80%, 90% of the width of the windshield 108. Substantially the entire width of the windshield 108 may be at least 80% of the entire width of the windshield 108. A larger sound emitting module advantageously provides for including a larger number of sound emitting units 106 which enables for improving the audio quality of the entertainment system 100, and for better distribution of the sound in the vehicle cabin.

Figure 2A:
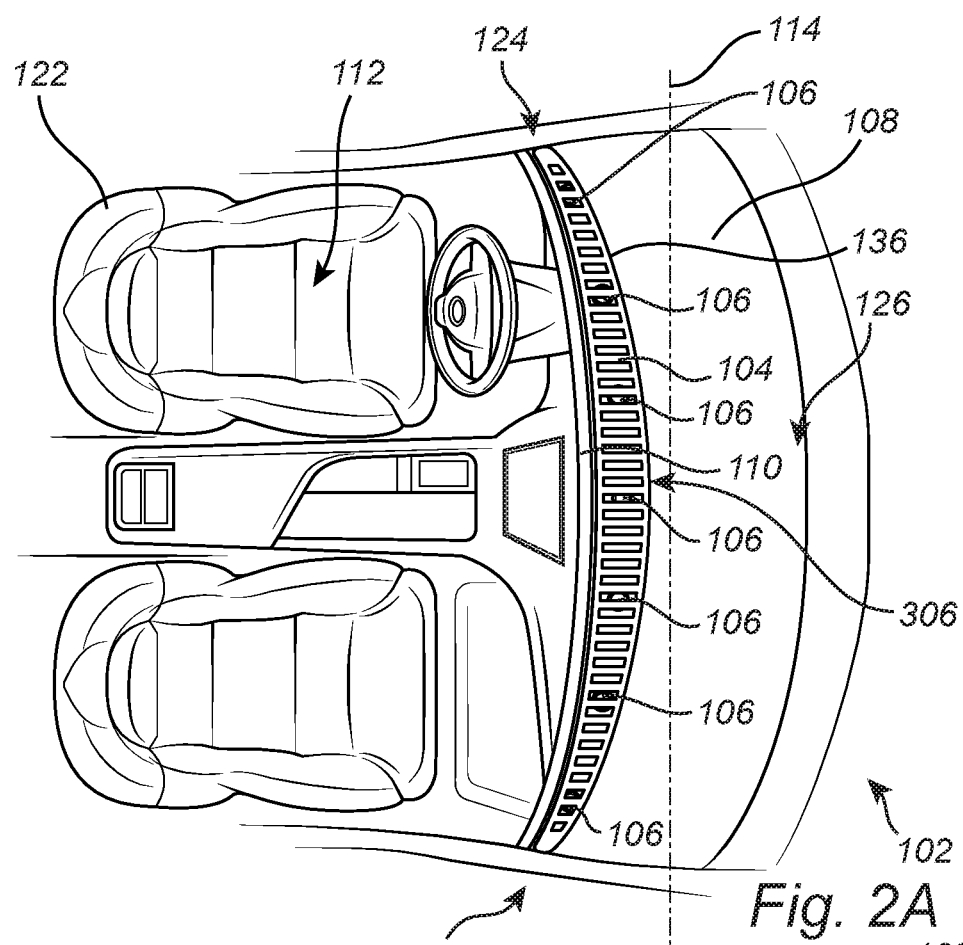
FIG. 2A conceptually illustrates an entertainment system for a vehicle according to embodiments of the present disclosure.
Figure 2B:
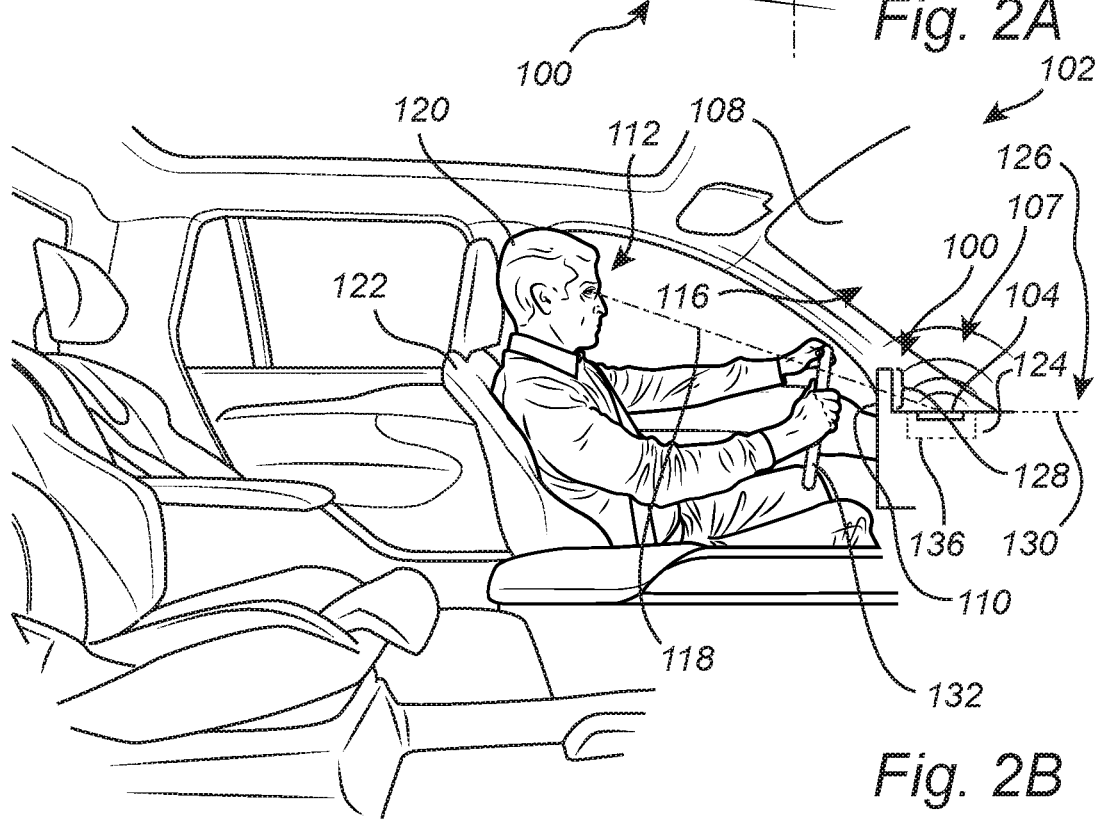
FIG. 2B is a side view of the entertainment system shown in FIG. 2A.

FIG. 2A schematically illustrates the entertainment system 100, and that the sound emitting module 104 is adapted to be arranged in an air vent outlet 136 arranged adjacent to the windshield 108 of the vehicle and adapted to direct an air flow towards the windshield 108, the air vent outlet 136 having a main extension along the width of the windshield 108. FIG. 2B is a side view of the entertainment system 100 having the sound emitting module 104 arranged in an air vent outlet 136. This provides for improved integration of the sound emitting module 104 in the vehicle interior. For example, an an air vent mesh 306 may be arrangeable to cover the air vent outlet and the multiple sound emitting units as will be described in more detail with reference to subsequent drawings. Thus, the multiple sound emitting units are hidden under the same mesh as the air vent outlet, thereby reducing the number of parts and thereby also the overall cost.

The air vent outlet 136 may extend along substantially the entire width of the windshield.

Turning now to FIG. 2B, the display device 110 is arranged adjacent to the air vent outlet 136, and in the plane of the air vent outlet 136 further from the windshield 108 than the air vent outlet 136. Further, the display device 110 is arranged in the line of sight 118 from the occupant seating position 112 to the air vent outlet.

FIG. 3A conceptually illustrates a sound emitting module 104 arranged in an air vent outlet 136. The sound emitting module includes a support structure 302 supporting each of the sound emitting units 106 and 304. The sound emitting module includes at least two different types of sound emitting units 106 and 304 having different audio characteristics. For example, a first type of sound emitting units 106 (only one is numbered) may adapted for a different frequency range of sound than a second type of sound emitting units 304 (only one is numbered). Example types of sound emitting units include subwoofers, woofers, mid-range, tweeters. A sound emitting module may include more than two types of sound emitting units, such as three, or four, or five different types of sound emitting units.

An air vent mesh 306 is arrangeable to cover the air vent outlet 136 and the multiple sound emitting units 106, 306 as is conceptually illustrated in FIG. 3B. The air vent mesh 306 includes openings 308 that allow for air and sound-waves to propagate through the mesh 306.

The air vent outlet 136 may be a defroster air outlet for supplying an air flow for defrosting the windshield 108. A defroster air outlet provides a suitable location for integrating the sound emitting module 104. Firstly, the location allows for hiding the sound emitting module 104 behind the display device 110. Further the defroster air outlet 136 has an extension across the width of the windshield for providing an air flow thereto. Accordingly, the sound emitting module may therefore also be arranged along the width of the windshield.

Tuning again to FIG. 3A, the air vent outlet 136 may be included in a cross-car beam 310. The cross-car beam 310 may be adapted for absorbing impact energy in the event of a collision. Accordingly, the cross-car beam may be adapted for causing a desired behavior of the vehicle structure in the event of a collision. For example, the cross-car beam may be adapted to bend in a predictive way in order to absorb energy in a collision. Further, the cross-car beam may be adapted to prevent a collapse of the vehicle cabin in the event of a collision.

The cross-car beam 306 is adapted to reach from side-to-side in the vehicle. Again, the term side-to-side means along an axis perpendicular to a vehicle heading, e.g. from left-to-right of the vehicle is considered side-to-side.

The cross-car beam 310 further includes attachment portions 330, 331 extending from the frame structure 112 for mounting of the cross-car beam 310 to a vehicle body. In this example embodiment, the attachment portions 330, 331 include holes 333 for bolting or screwing the cross-car beam to the vehicle body. The cross-car beam is adapted to be arranged in a lateral orientation in the vehicle, i.e. along a side-to-side direction of the vehicle. The attachment portions 330, 331 extend downwards from a main body 314 of the cross-car beam, when the cross-car beam is arranged in a vehicle.

Figure 4:
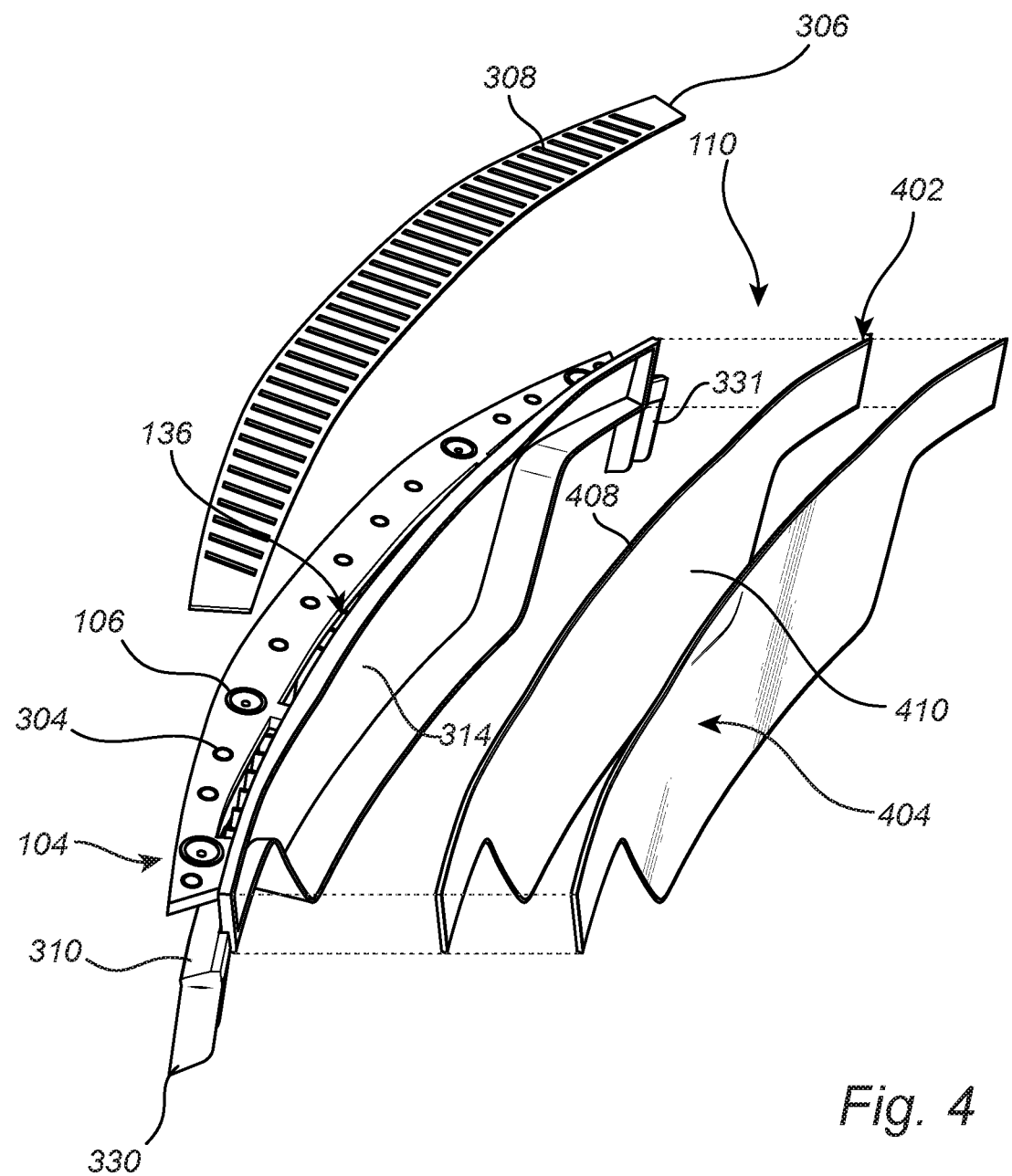
FIG. 4 conceptually illustrates an entertainment system according to embodiments of the present disclosure.

The cross-car beam 306 is here shown to include a set of flanges 336. The flanges 336 are adapted as cooling flanges for improving the cooling of a display device attached to the main body 314, as shown in FIG. 4. Generally, flanges 336 increase the surface area in contact with surrounding ambient air to thereby improve the heat exchange for the component attached to the flanges with the ambient air. The flanges 336 are attached to a shoulder 338 of the cross-car beam 310 which includes a center valley portion 340 neighboring side shoulder portions 342 and 344. At least a portion of the flanges 336 are attached to the valley shoulder portion 340. The flanges 336 are generally planar, and plate shaped and arranged in parallel although this is not strictly required. The valley shoulder portion 340 is adapted to receive cooling air from the climate system of the vehicle, for example from a defroster air vent arranged adjacent a windshield. The air from the climate system passes in between the flanges so that heat may be exchanged between the flanges and the air.

The sound emitting module 104 may be attached to the side shoulder portions 342 and 344 by suitable means including screws, bolts, nut and pin bolt, adhesives, clips, etc.

FIG. 4 conceptually illustrates an entertainment system according to embodiments of the present disclosure. Here, the display device 110 includes a matrix of color controllable light emitting units 402 attached to a first side of the cross-car beam 310. The first side is opposite to the side of the cross-car beam where the sound emitting module 104 is arranged. Further, the air vent outlet 136 is included on a second side of the cross-car beam opposite the first side.

The sound emitting module may be a soundbar. A soundbar includes a set of speakers having multiple characteristics, to in this way provide a complete audio solution.

There is further provided a vehicle including the entertainment system according to embodiments of the present disclosure.

There is further provided a sound emitting module for a vehicle entertainment system, the sound emitting module includes multiple sound emitting units adapted to be arranged such that the multiple sound emitting units are distributed along the transverse extension of a windshield of the vehicle and to emit sound towards the windshield, and covered by a display device arranged between the sound emitting module and an occupant seating position, wherein the sound emitting module is arranged behind the display device as seen from the occupant seating position.

There is further provided a display device for a vehicle entertainment system, adapted to be arranged between a sound emitting module and an occupant seating position, wherein the sound emitting module is adapted to be arranged such that multiple sound emitting units of the sound emitting module are distributed along the transverse extension of a windshield of the vehicle and to emit sound towards the windshield, wherein the display device is arranged to cover the sound emitting module as seen from the occupant seating position.

The display device 110 includes a matrix 402 of color controllable light emitting units covered by an at least partly transparent cover. The display device further includes a back-cover structure for mechanically supporting the matrix of color controllable light emitting units and to cover the side of the matrix of color controllable light emitting units opposite from the side of the transparent cover. The matrix of color controllable light emitting units are interleaved between the at least partly transparent cover and the back-cover structure. The back-cover structure may be the cross-car beam 310.

Accordingly, the cross-car beam can serve as a back-cover structure for the display device. This insight provides for integrating entertainment systems including displays and sound emitting modules in the vehicle interior without compromising the structural integrity of the vehicle. In fact, the entertainment system contributes to the structural integrity since the display device includes a cross-car beam onto which the sound emitting module is attached too. Furthermore, a cross-car beam has wide extension in the cross-car direction, thereby enabling for a wide matrix of color controllable light emitting units to be installed in the cross-car beam opening for larger display devices in vehicles.

In prior art displays, a back cover is often provided as a plastic housing part. The prior art display is attached to a dedicated rack or similar structure. When the display is large, this becomes cumbersome. Therefore, the display device back cover constitutes a cross-car beam, in other words, the matrix of color controllable light emitting units is attached on the cross-car beam without any additional back covers.

Turning again to FIG. 4, the cross-car beam 310 thus includes a main body 314 that is adapted to cover the back side 408 of the matrix 402 of color controllable light emitting units such that the matrix 402 of color controllable light emitting units are protected at the back side 408. The sound emitting module 104 is arranged on the opposite side of the cross-car beam, i.e. covered by the display device. The back side is 408 is opposite the front side 410.

The at least partly transparent cover 404 is a see-through cover arranged to protect the front side 410 of the matrix 402 of color controllable light emitting units from mechanical damage. The at least partly transparent cover 404 may include optical filters. However, the at least partly transparent cover 404 is adapted such that the matrix 402 of color controllable light emitting units can transmit visible light through the at least partly transparent cover 404 so that the visible light is emitted from the front side 410 towards a user facing the front side 410. The at least partly transparent cover 404 may for example be made from glass. The emitted light is transmitted through the material, e.g. the glass, of the at least partly transparent cover 404.

The matrix 402 of color controllable light emitting units may be directly attached to the cross-car beam 310. In other words, the matrix 402 of color controllable light emitting units may abut against the cross-car beam 310.

The color controllable light emitting units may include pixel elements of various types adapted to emit color controllable light. The matrix 402 of color controllable light emitting units may further include e.g. optical filters such as polarizing filters, glass substrates, reflective surfaces, or other components necessary for the structure and function of a display. For example, the color controllable light emitting units may be pixel elements of types including liquid crystal display pixels elements, light emitting diode pixel elements, organic light emitting diode pixel elements. Thus, the matrix 402 of color controllable light emitting units may be a display including liquid crystal display pixels elements. In other possible implementations, the matrix 402 of color controllable light emitting units may be a display including light emitting diode pixel elements. In other possible implementations, the matrix 402 of color controllable light emitting units may be a display including organic light emitting diode pixel elements.

The cross-car beam 310 may be made by extrusion or molding and made be made from magnesium for reducing the weight of the beam 310.

The entertainment system according to embodiments of the present disclosure is controlled by at least one control unit which may be configured to receive input commands from users and control the sound emitting module and the display device to emit audio signals and display images, videos, or other data and information as requested. The specific details regarding control and operation of a vehicle entertainment systems including displays and speakers is considered known to the skilled person and will not be described in detail herein.

The entertainment system may further include wireless communication means for receiving and sending data and from/to a server, or generally the "Cloud", from/to handheld electronic devices such as mobile phones, tablets, laptops, etc., or from other vehicles or infrastructure i.e. V2V or V2X. Such wireless communication means may include any of Wifi, 3G, 4G, 5G, etc., Bluetooth, IR-communication.

A control unit may include a microprocessor, microcontroller, programmable digital signal processor or another programmable device, as well as be embedded into the vehicle/power train control logic/hardware. The control unit may also, or instead, include an application-specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. The control unit may include modules in either hardware or software, or partially in hardware or software and communicate using known transmission buses such as CAN-bus and/or wireless communication capabilities.

The person skilled in the art realizes that the claimed invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other control unit may fulfil the functions of several items recited in the claims. The mere fact that certain measures are recited in mutually different dependent claims does not indicate that a combination of these measured cannot be used to advantage. Any reference signs in the claims should not be construed as limiting the scope.

Various examples have been described. These and other examples are within the scope of the following claims.

The invention claimed is:

1. An entertainment system for a vehicle, the entertainment system comprising:
    a sound emitting module including multiple sound emitting units, wherein the sound emitting module is adapted to be arranged in an air vent outlet arranged adjacent to a windshield of the vehicle and adapted to direct an air flow towards the windshield, the air vent outlet having a main extension along the width of the windshield, and arranged such that the multiple sound emitting units are distributed along the transverse extension of the windshield and to emit sound towards the windshield, and
    a display device arranged between the sound emitting module and an occupant seating position to cover and obstruct a view of the sound emitting module arranged behind the display device as seen from the occupant seating position.

2. The entertainment system according to claim 1, wherein the multiple sound emitting units are distributed along substantially the entire width of the windshield.

3. The entertainment system according to claim 1, wherein the multiple sound emitting units are arranged to emit sound waves directly towards the windshield such that the soundwaves are redirected by the windshield rearwards in the vehicle cabin.

4. The entertainment system according to claim 1, wherein the sound emitting module includes a support structure supporting each of the sound emitting units.

5. The entertainment system according to claim 1, comprising an air vent mesh arrangeable to cover the air vent outlet and the multiple sound emitting units.

6. The entertainment system according to claim 1, wherein the display device is arranged adjacent to the air vent, further from the windshield in the plane of the air vent than the air vent.

7. The entertainment system according to claim 1, wherein the display device is arranged in the line of sight from the occupant seating position to the air vent outlet.

8. The entertainment system according to claim 1, wherein the display device includes a matrix of color controllable light emitting units and is attachable to a first side of a cross-car beam.

9. The entertainment system according to claim 8, wherein the air vent outlet is included on a second side of the cross-car beam opposite the first side.

10. The entertainment system according to claim 1, wherein the sound emitting module includes at least two different types of sound emitting units having different audio characteristics.

11. The entertainment system according to claim 1, wherein the sound emitting module is a soundbar.

12. The entertainment system according to claim 1, wherein the air vent outlet is a defroster air outlet for supplying an air flow for defrosting the windshield.

13. A vehicle comprising the entertainment system according to claim 1.

14. A sound emitting module for a vehicle entertainment system, the sound emitting module comprising multiple sound emitting units adapted to be arranged in an air vent outlet arranged adjacent to a windshield of the vehicle and adapted to direct an air flow towards the windshield, the air vent outlet having a main extension along the width of the windshield, and arranged such that the multiple sound emitting units are distributed along the transverse extension of the windshield and to emit sound towards the windshield, and covered by a display device arranged between the sound emitting module and an occupant seating position, wherein the sound emitting module is arranged behind the display device such that the sound emitting module is covered by the display device and a view of the sound emitting device is obstructed by the display device as seen from the occupant seating position.

15. The sound emitting module according to claim 14, wherein the sound emitting module is a soundbar.

16. A display device for a vehicle entertainment system, adapted to be arranged between a sound emitting module and an occupant seating position, wherein the sound emitting module is adapted to be arranged in an air vent outlet arranged adjacent to a windshield of the vehicle and adapted to direct an air flow towards the windshield, the air vent outlet having a main extension along the width of the windshield, and arranged such that multiple sound emitting units of the sound emitting module are distributed along the transverse extension of the windshield and to emit sound towards the windshield, wherein the display device is arranged to cover and obstruct a view of the sound emitting module as seen from the occupant seating position.

17. The display device according to claim 16, wherein the display device is attachable to a first side of a cross-car beam, opposite to the side of the cross-car beam where the sound emitting module is arranged.

18. An entertainment system for a vehicle, the entertainment system comprising:
a sound emitting module including multiple sound emitting units, wherein the sound emitting module is adapted to be arranged such that the multiple sound emitting units are distributed along the transverse extension of a windshield of the vehicle and to emit sound towards the windshield, and
a display device arranged between the sound emitting module and an occupant seating position to cover and obstruct a view of the sound emitting module arranged behind the display device,
wherein the sound emitting module is adapted to be arranged in an air vent outlet arranged adjacent to the windshield of the vehicle and adapted to direct an air flow towards the windshield, the air vent outlet having a main extension along the width of the windshield.

19. An entertainment system for a vehicle, the entertainment system comprising:
a sound emitting module including multiple sound emitting units, wherein the sound emitting module is adapted to be arranged such that the multiple sound emitting units are distributed along the transverse extension of a windshield of the vehicle and to emit sound towards the windshield, and
a display device arranged between the sound emitting module and an occupant seating position to cover and obstruct a view of the sound emitting module arranged behind the display device as seen from the occupant seating position;
wherein the display device includes a matrix of color controllable light emitting units and is attachable to a first side of a cross-car beam.

* * * * *